United States Patent
Vollmer (10) Patent No.: US 9,643,660 B2
(45) Date of Patent: May 9, 2017

(54) BUMPER ASSEMBLY FOR AN UNDERCARRIAGE MOUNTED BATTERY PACK

(71) Applicant: Atieva, Inc., Menlo Park, CA (US)

(72) Inventor: Axel Boris Vollmer, Sunnyvale, CA (US)

(73) Assignee: ATIEVA, INC., Menlo Park, CA (US)

( * ) Notice: Subject to any disclaimer, the term of this patent is extended or adjusted under 35 U.S.C. 154(b) by 0 days.

(21) Appl. No.: 14/837,345

(22) Filed: Aug. 27, 2015

(65) Prior Publication Data

US 2017/0057556 A1    Mar. 2, 2017

Related U.S. Application Data

(63) Continuation-in-part of application No. 14/837,172, filed on Aug. 27, 2015.

(51) Int. Cl.
| | | |
|---|---|---|
| *B60K 1/00* | (2006.01) | |
| *B62D 25/20* | (2006.01) | |
| *B60L 11/18* | (2006.01) | |
| *B60K 1/04* | (2006.01) | |

(52) U.S. Cl.
CPC ............ *B62D 25/2072* (2013.01); *B60K 1/04* (2013.01); *B60L 11/1879* (2013.01); *B60K 2001/0438* (2013.01)

(58) Field of Classification Search
CPC .... B60K 2001/0405; B60K 2001/0438; B60K 1/00; B60K 1/04
See application file for complete search history.

(56) References Cited

U.S. PATENT DOCUMENTS

| | | | | |
|---|---|---|---|---|
| 4,216,839 A * | 8/1980 | Gould | ...................... | B60K 1/04 104/34 |
| 4,487,446 A * | 12/1984 | Reich, II | ................ | B60C 23/10 137/899.4 |
| 5,372,216 A | 12/1994 | Tsuji et al. | | |
| 6,511,119 B2 * | 1/2003 | Takase | ................ | B62D 21/152 280/784 |
| 6,547,020 B2 * | 4/2003 | Maus | ....................... | B60K 1/04 180/68.5 |
| 7,597,040 B2 | 10/2009 | Gabrys | | |
| 8,286,743 B2 * | 10/2012 | Rawlinson | .............. | F41H 7/042 180/68.5 |
| 8,479,858 B2 * | 7/2013 | Kodaira | ................... | B60K 1/04 180/68.5 |
| 8,875,828 B2 * | 11/2014 | Rawlinson | .............. | B60K 1/04 180/68.5 |
| 8,985,258 B1 * | 3/2015 | Midoun | ................ | B62D 25/082 180/274 |
| 9,016,765 B1 | 4/2015 | Rawlinson | | |
| 9,061,714 B1 * | 6/2015 | Albery | ................ | B62D 21/155 |
| 9,079,619 B2 * | 7/2015 | Gupta | ................ | B62D 21/152 |

(Continued)

*Primary Examiner* — Erez Gurari
(74) *Attorney, Agent, or Firm* — Patent Law Offices of David G. Beck (57) ABSTRACT

A battery pack protection system is provided for use with an electric vehicle in which the battery pack is mounted under the car. The system utilizes a bumper that is attached to the front of the battery pack enclosure and which is configured to (i) deflect debris striking the bumper and (ii) absorb impact energy due to the debris, thereby minimizing the transference of impact energy to the battery pack and the batteries contained within the pack.

29 Claims, 9 Drawing Sheets (56) References Cited

U.S. PATENT DOCUMENTS

| | | | |
|---|---|---|---|
| 2006/0278463 A1 | 12/2006 | Anzai et al. | |
| 2006/0289224 A1* | 12/2006 | Ono | B60K 1/04 180/311 |
| 2009/0021052 A1 | 1/2009 | Kato | |
| 2009/0226806 A1 | 9/2009 | Kiya | |
| 2009/0242299 A1 | 10/2009 | Takasaki et al. | |
| 2010/0313745 A1 | 12/2010 | Hawkins et al. | |
| 2011/0068606 A1 | 3/2011 | Klimek et al. | |
| 2012/0187720 A1 | 7/2012 | Tomozawa et al. | |
| 2013/0270860 A1 | 10/2013 | Young et al. | |
| 2013/0270862 A1 | 10/2013 | Hotta et al. | |
| 2014/0174840 A1* | 6/2014 | Knoblauch | B60K 1/04 180/68.5 |
| 2014/0338999 A1* | 11/2014 | Fujii | B60K 1/04 180/68.5 |
| 2014/0374180 A1* | 12/2014 | Katayama | B60K 1/04 180/68.5 |
| 2015/0273996 A1* | 10/2015 | Onodera | B60K 1/04 429/100 |
| 2016/0068195 A1* | 3/2016 | Hentrich | B60K 1/04 180/68.5 |
| 2016/0129774 A1* | 5/2016 | Shibata | B60K 1/00 180/297 |

* cited by examiner

Prior Art

FIG. 12

Prior Art

BUMPER ASSEMBLY FOR AN UNDERCARRIAGE MOUNTED BATTERY PACK

CROSS-REFERENCE TO RELATED APPLICATION

This application is a continuation-in-part of U.S. patent application Ser. No. 14/837,172, filed 27 Aug. 2015, the disclosure of which is incorporated herein by reference for any and all purposes.

FIELD OF THE INVENTION

The present invention relates generally to electric vehicles and, more particularly, to a battery bumper assembly configured to provide undercarriage protection to the battery pack of an electric vehicle.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, safety and cost.

In recent years there have been several incidents of a rechargeable battery pack, either contained within a laptop computer or utilized in a vehicle, catching on fire. As a result, one of the primary issues impacting consumer confidence with respect to both hybrid and all-electric vehicles is the risk of a battery pack fire.

Rechargeable batteries tend to be relatively unstable and prone to thermal runaway, an event that occurs when a battery's internal reaction rate increases to such an extent that it is generating more heat than can be withdrawn. If the reaction rate and generation of heat go unabated, eventually the heat generated becomes great enough to cause the battery and materials in proximity to the battery to combust. While thermal runaway is typically the result of a battery short or a manufacturing defect, damage such as that which may occur during an accident or when road debris dents or punctures the battery pack may also lead to a thermal runaway event.

Due to the risk of a battery pack fire, electric vehicle (EV) manufacturers use a variety of techniques to shield their battery packs from the possible damage that may result from road debris or a vehicle collision. For example, in a vehicle using a relatively small battery pack such as a hybrid, the pack may be protected by placing it within the rear trunk, behind the rear seats, under the front seats, or in another comparatively well protected location. Vehicles utilizing large battery packs, however, are typically forced to mount the pack under the car. To protect such a pack, a ballistic shield or a debris trap may be located between the road surface and the bottom of the pack, for example as disclosed in co-assigned U.S. Pat. Nos. 9,016,765 and 9,061,714, respectively.

Although the prior art teaches a variety of techniques for protecting an EV's battery pack from potential harm, including mounting the pack in a relatively protected region of the car or positioning ballistic shields beneath the pack, given the severity of the consequences accompanying a catastrophic battery pack event, further techniques for protecting an under-carriage mounted battery pack are desired. The present invention provides such a battery pack protection system.

SUMMARY OF THE INVENTION

The present invention provides a battery pack protection system configured for use with a battery pack enclosure that is mounted under an electric vehicle (EV) and that is configured to house a plurality of batteries, the protection system including a bumper that is attached to the front portion of the battery pack enclosure, where a central portion of the bumper extends furthest forward of the front portion of the battery pack enclosure, and where a lower edge of the bumper is at least as close to, and preferably closer to, the surface of the road than the lowermost surface of the battery pack enclosure. The battery pack enclosure may include a front cross-member, where the bumper is mechanically coupled to the front portion of the battery pack enclosure via the front cross-member, and where the central portion of the bumper extends furthest forward of a plane containing the front cross-member. The battery pack enclosure may be attached to the vehicle chassis via the left-side and right-side rockers, and may extend substantially between the front and rear suspension assemblies. The bumper, which preferably has a strength of at least 1000 MPa, may be fabricated from steel, and may be attached to the front portion of the battery pack enclosure using a fabrication technique selected from welding, bonding, soldering, brazing and bolting.

In one aspect, the bumper may be configured such that the separation distance between the bumper's front surface and the front portion of the battery pack enclosure continually decreases from the central portion to the leftmost bumper edge, and continually decreases from the central portion to the rightmost bumper edge. The front surface of the bumper may have a curvilinear shape.

In another aspect, the bumper may be configured such that at least a portion of the bumper's front surface is curvilinear and at least a second portion of the bumper's front surface is linear. The bumper may further be configured such that the separation distance between the bumper's front surface and the front portion of the battery pack enclosure is greatest at the central portion of the bumper and least at the leftmost and rightmost bumper edges.

In another aspect, a plurality of bracing struts may be interposed between the bumper and the front portion of the battery pack enclosure.

In another aspect, an energy absorbing compressible material (e.g., open-cell sponge, closed-cell sponge, open-cell foam, closed-cell foam) may be interposed between the bumper and the front portion of the battery pack enclosure.

In another aspect, the system may include a secondary bumper plate that is mechanically coupled to the bumper via a plurality of bracing struts, and where the bumper is mechanically coupled to the front portion of the battery pack enclosure via the secondary bumper plate.

In another aspect, the system may include a secondary bumper plate configured such that the bumper is mechanically coupled to the front portion of the battery pack enclosure via the secondary bumper plate. An energy absorbing compressible material (e.g., open-cell sponge, closed-cell sponge, open-cell foam, closed-cell foam) may be interposed between the bumper and the secondary bumper plate.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations or components, these steps, calculations or components should not be limited by these terms, rather these terms are only used to distinguish one step, calculation or component from another. For example, a first calculation could be termed a second calculation, and, similarly, a first step could be termed a second step, without departing from the scope of this disclosure.

In the following text, the terms "battery", "cell", and "battery cell" may be used interchangeably and may refer to any of a variety of different battery configurations and chemistries. Typical battery chemistries include, but are not limited to, lithium ion, lithium ion polymer, nickel metal hydride, nickel cadmium, nickel hydrogen, nickel zinc, and silver zinc. The term "battery pack" as used herein refers to an assembly of batteries electrically interconnected to achieve the desired voltage and capacity, where the battery assembly is typically contained within an enclosure. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

Figure 1:
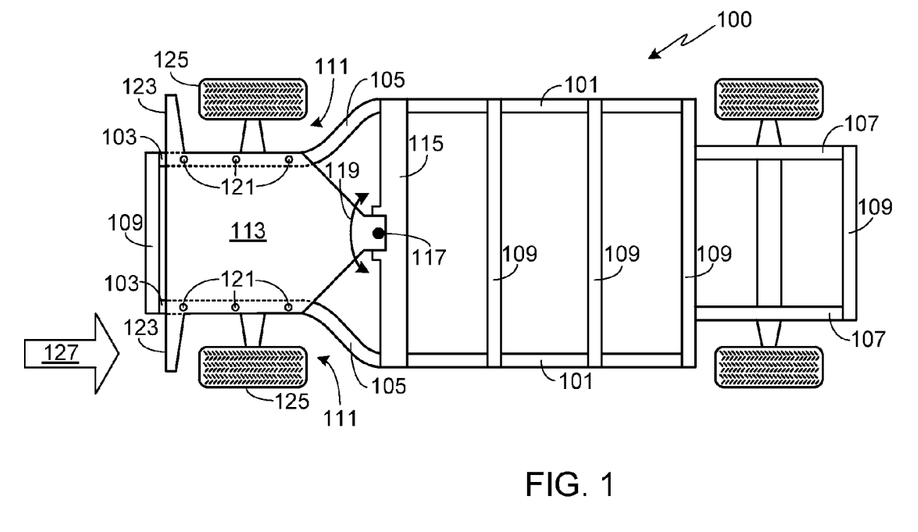
FIG. 1 provides a simplified view of the underside of a vehicle utilizing the swiveling front suspension subframe of the invention.

FIG. 1 is a simplified view of the underside of a vehicle 100. In this simplified view only a few of the primary chassis components are shown, specifically rockers 101, front rails 103, curvilinear torque boxes 105, rear rails 107, and a plurality of cross-members 109. For clarity this figure does not include any drive train components. It should be understood that the invention, as described in detail below, is equally applicable to other vehicle chassis configurations.

Rather than being attached directly to front rails 103, the front suspension assemblies 111 are attached to subframe 113. Subframe 113 is attached to cross-member 115 via hinge-mount 117, thus allowing subframe 113 and attached suspension assemblies 111 to swivel in-plane, i.e., parallel to the plane containing the chassis. Movement of subframe 113 about hinge-mount 117 is indicated in FIG. 1 by arrows 119. To prevent subframe 113 from swiveling about hinge-mount 117 during normal vehicle operation, subframe 113 is attached to front rails 103 (shown, in part, in phantom) by a plurality of break-away fasteners 121. Subframe 113 includes a pair of subframe activation lever arms 123, also referred to herein simply as lever arms, that extend away from either side of the subframe. Lever arms 123 are located in front of the front wheel assemblies 125 and extend completely, or at least partially as shown, in front of the front wheel assemblies. Lever arms 123 may be fabricated as part of subframe 113 or fabricated separately and then attached to the subframe with bolts or via a welding, bonding, soldering, brazing or similar process.

As previously noted, during normal vehicle use subframe 113 is mounted rigidly to the vehicle's chassis and, more specifically, rigidly coupled to front rails 103. However during a small overlap collision, e.g., a collision in which only a front corner of the vehicle is struck, break-away fasteners 121 are configured to release, thereby allowing subframe 113 and the attached suspension assemblies 111 to swivel out and away from the vehicle. As a result, the wheel assembly directly involved in the collision is not driven into the passenger cabin, thereby increasing passenger safety during this type of collision.

Figure 2:
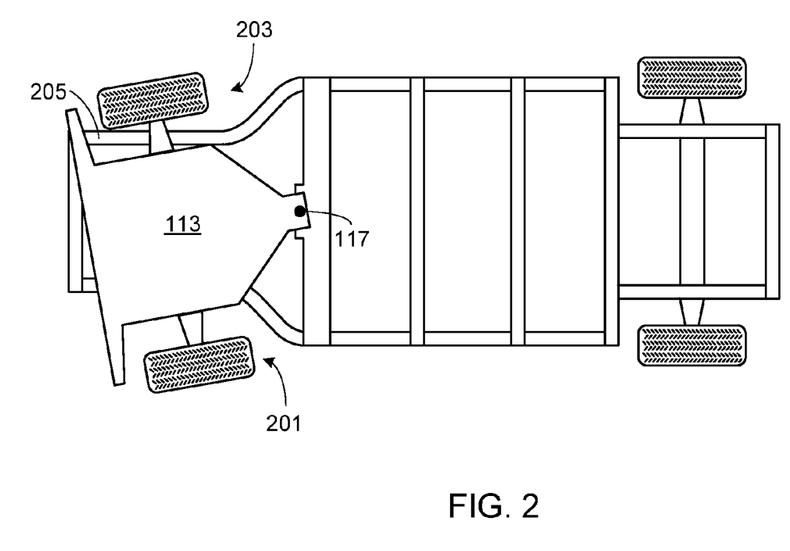
FIG. 2 provides a view of the embodiment shown in FIG. 1 with the swiveling front suspension subframe in an initial stage of rotation.
Figure 3:
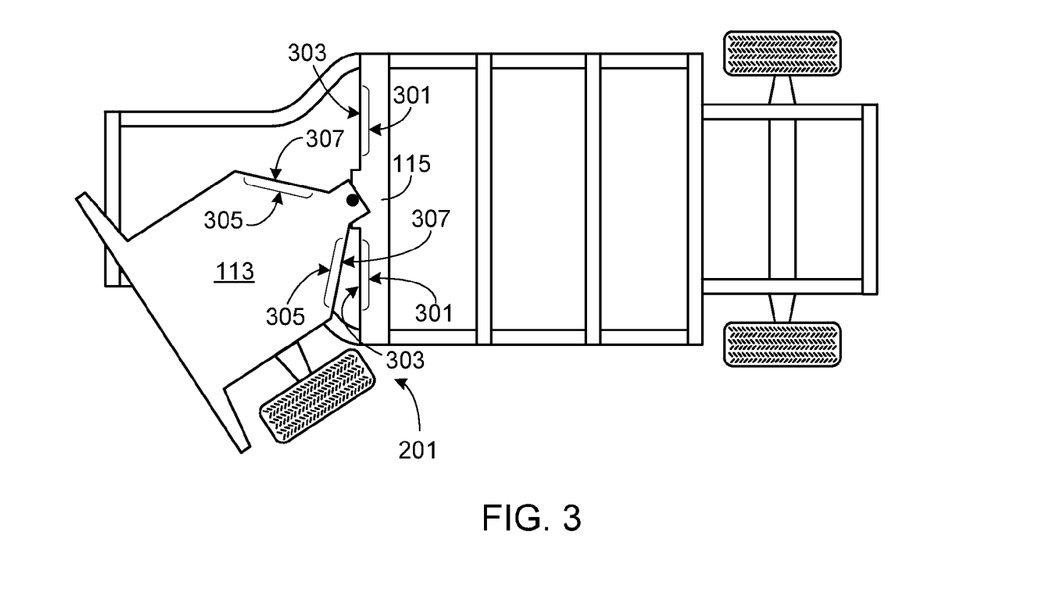
FIG. 3 provides a view of the embodiment shown in FIG. 2 with the swiveling front suspension subframe undergoing further rotation.
Figure 4:
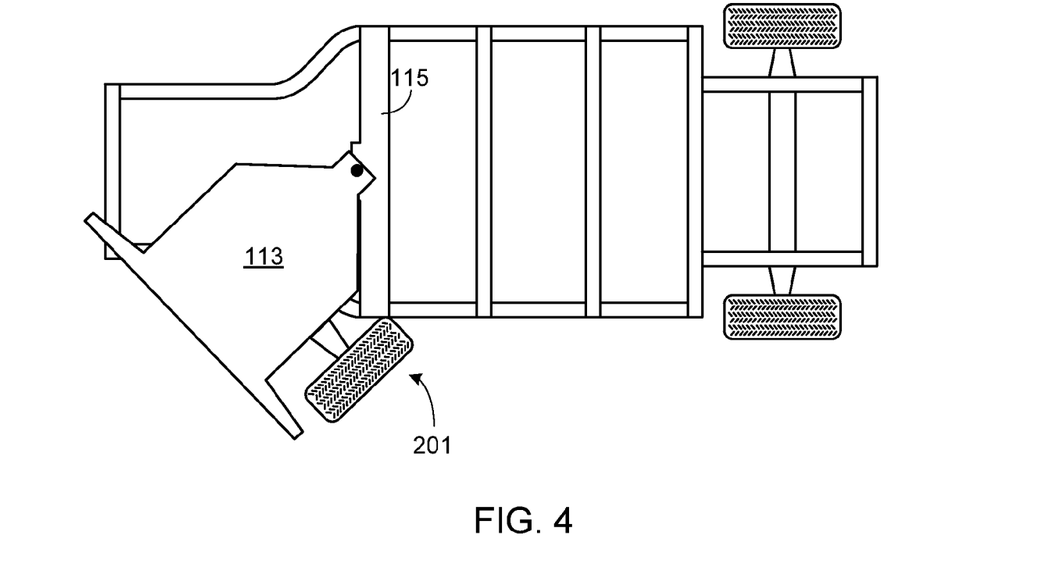
FIG. 4 provides a view of the embodiment shown in FIG. 3 with the swiveling front suspension subframe at its rotation limit.

FIGS. 1-4 illustrate movement of subframe 113 and the attached wheel assemblies 111 when vehicle 100 has a small overlap collision with an object (e.g., another vehicle or an inanimate object). As shown in FIG. 1, the collision applies a force 127 to the adjacent lever arm 123. This force causes the break-away fasteners 121 to release, thereby allowing subframe 113 and the attached front wheel subassemblies to begin rotating about hinge mount 117 as shown in FIG. 2. In this figure, due to force 127, subframe 113 has rotated partially about hinge 117, causing wheel assembly 201 to move out and away from the vehicle while forcing the opposite wheel assembly 203 to move in and towards adjacent front rail 205. As wheel assembly 203 is forced into front rail 205, some of the impact energy is absorbed. If the impact force is great enough, wheel assembly 203 will either be deformed or sheared off of the subframe, thereby allowing subassembly 201 and subframe 113 to continue to rotate about hinge mount 117 as shown in FIGS. 3 and 4. Although wheel subassembly 203 has been eliminated from FIGS. 3 and 4, it should be understood that this wheel assembly, or at least parts of this wheel assembly, may remain attached to subframe 113 throughout the collision. Clearly any portions of subassembly 203 that remain attached to subframe 113 throughout a significant impact would be heavily damaged and deformed.

Figure 5:
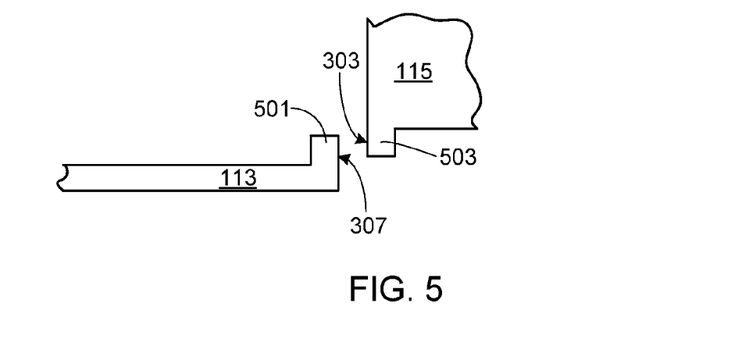
FIG. 5 provides a side view of a set of rotation limiting features that may be used to limit rotation of the swiveling front suspension subframe of the invention.

In the preferred embodiment of the invention, and as illustrated in FIGS. 3 and 4, the continued rotation of subframe 113 about hinge mount 117 is eventually limited by the interaction of a portion 301 of the leading edge 303 of cross-member 115 and a portion 305 of the trailing edge 307 of subframe 113. By limiting or at least impeding rotation of subframe 113, passenger safety is improved since the extent to which the subframe or any portion of the attached wheel assembly 201 may intrude into the passenger compartment is similarly limited. Although a variety of features may be included in leading edge 303 of cross-member 115 and/or trailing edge 307 of subframe 113 that can provide this limiting function, an exemplary configuration is illustrated in FIG. 5. As shown, in this exemplary configuration an extension or lip 501 has been fabricated onto a portion of the upper surface of trailing edge 307 of subframe 113 and an extension or lip 503 has been fabricated onto a portion of the lower surface of leading edge 303 of cross-member 115. As such, after the break-away fasteners 121 have been released due to the collision, subframe 113 is free to rotate about hinge mount 117 until lip 501 comes into contact with lip 503 as shown in FIG. 4.

While the primary function of subframe 113 during a small overlap collision is to rotate the wheel assembly closest to the collision's impact zone out and away from the car, thereby minimizing intrusion of the wheel assembly into the passenger compartment, a secondary function of the hinged subframe is to help redirect the impact force. Redirecting the impact force helps to further improve the vehicle's crashworthiness by reducing the crash force that is directly applied to the wheel assembly.

Figure 6:
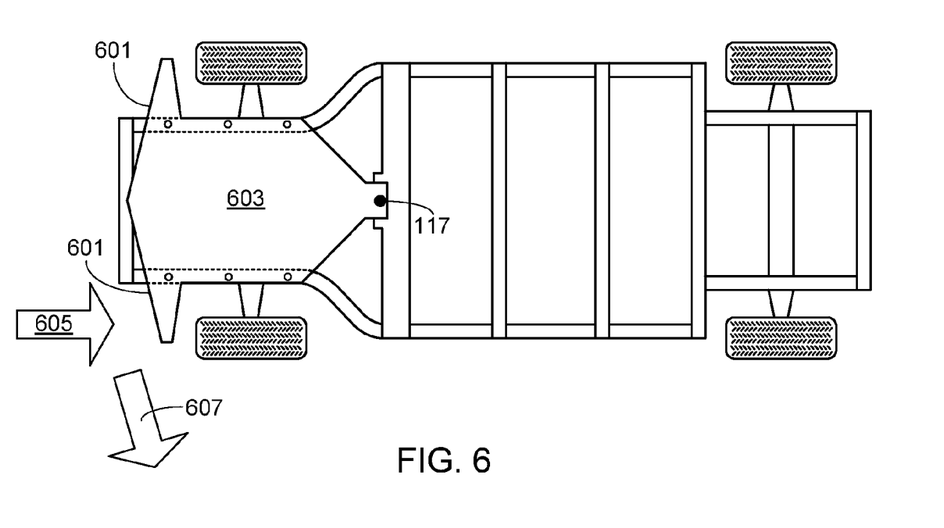
FIG. 6 provides a view of an embodiment similar to that shown in FIG. 1 in which the leading edge of the swiveling front suspension subframe has been shaped to help redirect impact force during a small overlap collision.
Figure 7:
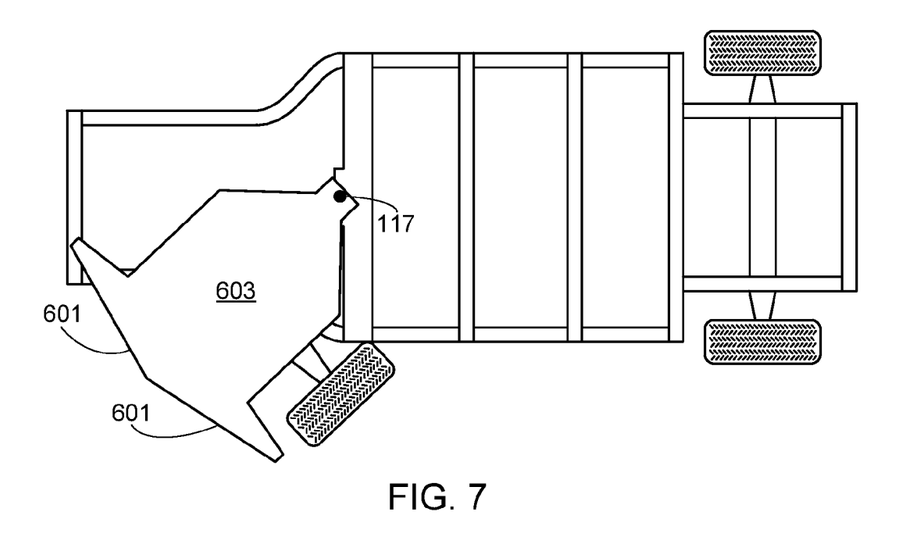
FIG. 7 provides a similar view of the embodiment shown in FIG. 6 with the swiveling front suspension subframe partially rotated.

In the embodiment described above, initially the leading edge of the subframe is perpendicular to the vehicle's centerline. As the subframe rotates about hinge-mount 117, the leading edge of the subframe rotates, creating a sloped edge that helps to re-direct the oncoming vehicle or object. The ability of the subframe to redirect the impact force of the collision can be further enhanced by adjusting the angle of the leading edge of the subframe. This leads to improved redirection of impact force since the redirection begins immediately upon impact, not waiting for the subframe to rotate. This aspect is illustrated in the exemplary embodiment shown in FIGS. 6 and 7 where the leading edge 601 of subframe 603 has been shaped so that the force of the collision which is initially in a direction 605 is partially redirected in a direction 607. As the subframe rotates, the angle of the leading edge increases, thereby further enhancing the ability of the system to redirect impact force (FIG. 7). It will be appreciated that whether the redirection of the impact force causes the vehicle to move away from the impact zone or causes the struck object to move away from the impact zone or both will depend on the relative masses and deformability of the vehicle and the object. Regardless of whether it is the vehicle or the object (or both) that moves slightly sideways during impact, the result is improved crashworthiness.

As described above, when a vehicle utilizing the swiveling subframe of the invention has a small overlap collision, a force is applied to the adjacent lever arm causing the break-away fasteners to release and allowing the subframe and attached wheel assemblies to rotate about the hinge mount. This process results in a large force being directed towards the hinge mount. Accordingly, in at least one embodiment cross-member 115 is strengthened at the hinge mount, preferably in a manner that directs impact force through the mount and towards other suitable regions of the chassis.

Figure 8:
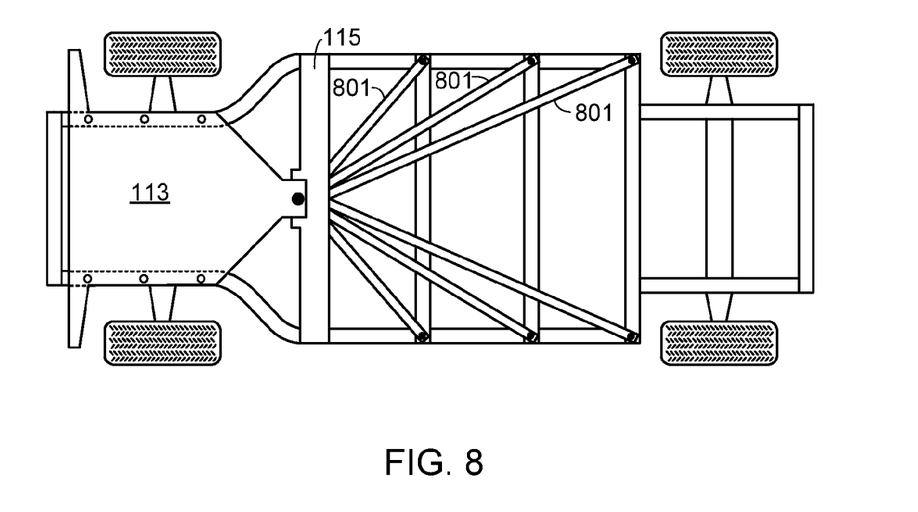
FIG. 8 provides a view of an embodiment similar to that shown in FIG. 1 which includes a plurality of strengthening members configured to distribute impact force throughout the vehicle chassis.

FIG. 8 illustrates an embodiment, based on the embodiment shown in FIG. 1, in which a plurality of members 801 are coupled to cross-member 115 at a region proximate to the hinge-mount 117. It will be appreciated that this configuration is equally applicable to embodiments utilizing a subframe with angled leading edges such as that shown in FIG. 6. The distal end of each member 801 is coupled to a different chassis location, thereby distributing the impact force throughout the vehicle. In a preferred embodiment, the distal end of each member 801 is coupled to the chassis at a location corresponding to a cross-member attachment point.

The use of a swiveling front wheel subassembly subframe is equally applicable to both electric and non-electric vehicles. While the same hinge-mount configurations shown above may be used in an EV, in vehicle configurations in which the EV's battery pack is mounted to the vehicle's undercarriage the inventor has found that the hinge-mount can be incorporated directly into the battery pack enclosure, thus taking advantage of the mechanical and structural strength and rigidity offered by the pack. In these configurations the battery pack is typically mounted between, and to, rockers 101. Such a battery pack enclosure often incorporates a plurality of cross-members within the pack itself, similar to the rocker-to-rocker cross-members used in a non-EV vehicle, thus providing a convenient means of distributing impact force.

Figure 9:
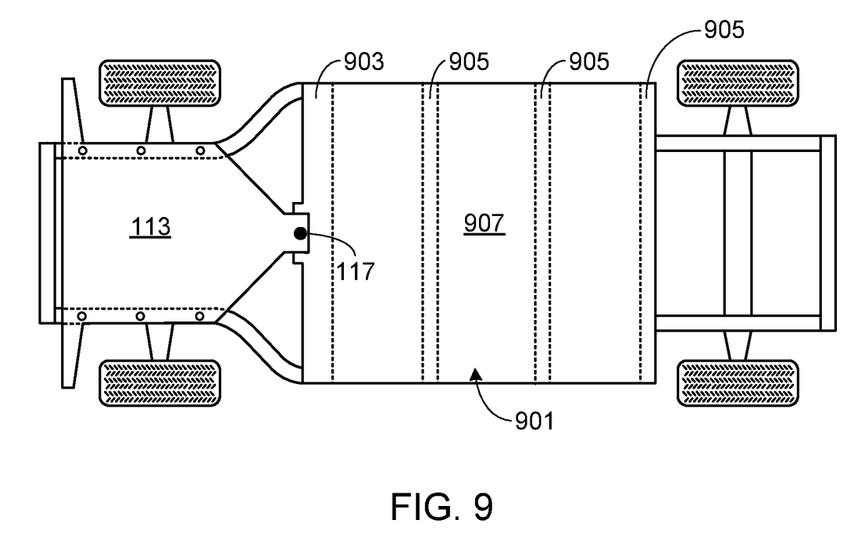
FIG. 9 provides a view of an embodiment similar to that shown in FIG. 1 which includes an undercarriage mounted battery pack enclosure.
Figure 10:
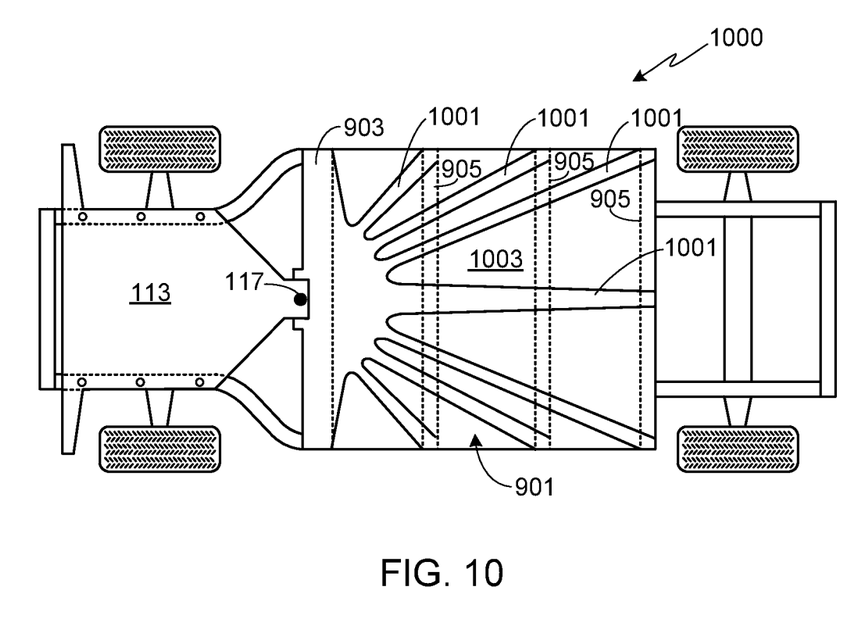
FIG. 10 provides a view of an embodiment similar to that shown in FIG. 9 which includes a plurality of strengthening members configured to distribute impact force throughout the vehicle chassis.

FIGS. 9 and 10 illustrate alternate configurations in which hinge-mount 117 is coupled to the battery pack enclosure 901, and more specifically coupled to the lead cross-member 903. Lead cross-member 903 as well as secondary cross-members 905 are shown in phantom as these members are incorporated within the pack enclosure in this embodiment and therefore are not visible due to lower battery pack panel 907. The primary difference between the embodiments shown in FIGS. 9 and 10 is that in vehicle 1000 a plurality of impact force distribution structures 1001 are incorporated into the lower battery pack panel 1003. Force distribution structures 1001 may be additional structures that are bolted, bonded, brazed or welded to lower battery pack panel 1003. Alternately and as preferred, force distribution structures 1001 may be comprised of ridges or similar structures that are fabricated directly into lower battery pack panel 1003. Regardless of whether the force distribution structures 1001 are added to, or formed as part of, battery pack panel 1003, preferably the distal end of each structure 1001 is co-located at an attachment point between the battery pack enclosure and the vehicle's undercarriage (e.g., rockers) as illustrated.

Figure 11:
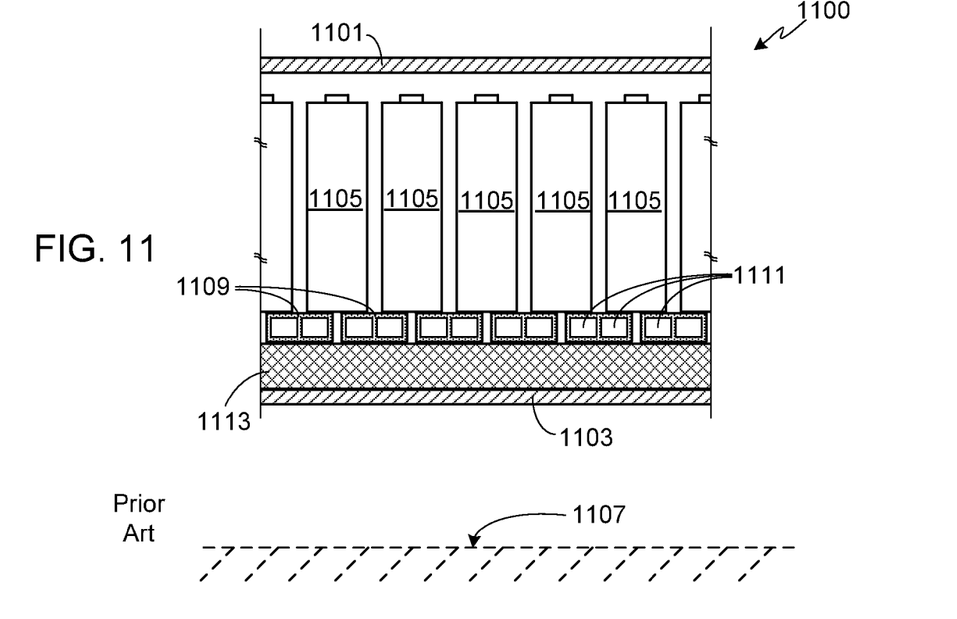
FIG. 11 provides a cross-sectional view of a portion of an exemplary battery pack.
Figure 12:
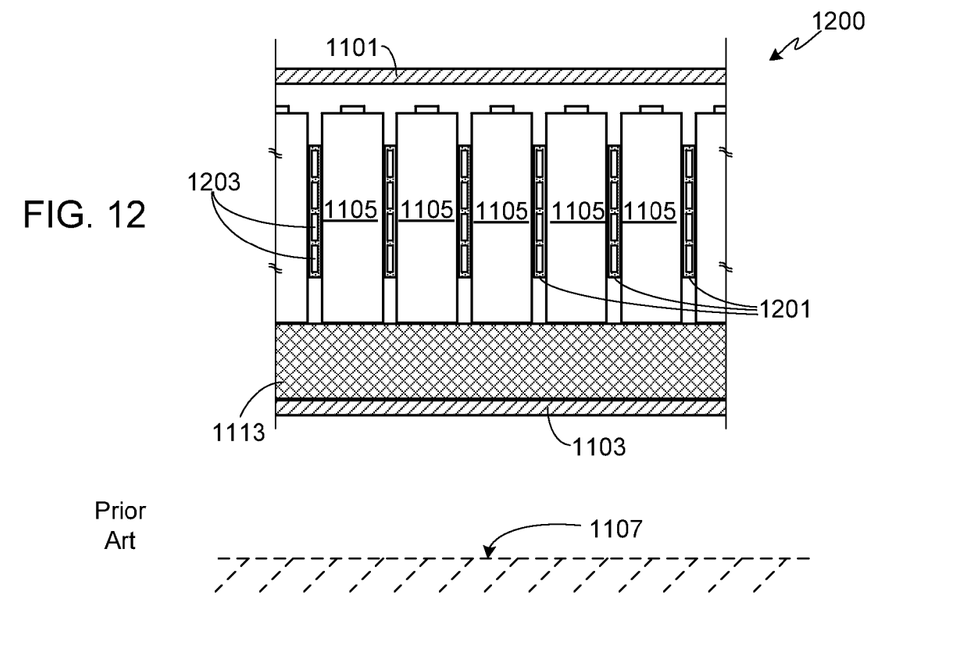
FIG. 12 provides a cross-sectional view of a portion of an alternate exemplary battery pack.

FIGS. 11 and 12 provide additional battery pack details for exemplary battery pack configurations suitable for use in the embodiments described herein. It should be understood that these configurations are for illustration purposes only, and that the inventions described herein may utilize alternate battery pack configurations. For purposes of clarity, battery interconnects and battery mounts are not included in either of these cross-sectional views. In these figures a portion of the upper pack enclosure panel 1101, a portion of the lower pack enclosure panel 1103, and a plurality of batteries 1105 are visible. Not visible in these figures, however, are the enclosure side panels and any internal battery pack cross-members. While the invention is not restricted to a particular battery pack configuration or a particular battery form-factor, preferably cylindrical batteries (e.g., 18650 form-factor batteries) are used and positioned such that the axis of each battery, i.e. the cylindrical axis, is substantially perpendicular to both lower enclosure panel 1103 and surface 1107 of the road. In battery pack configuration 1100, interposed between the base of each cylindrical battery 1105 and lower panel 1103 are a plurality of cooling conduits 1109 through which a liquid coolant, i.e., a heat transfer medium, is pumped. Alternately, and as illustrated in battery pack configuration 1200, cooling conduits 1201 may be interposed between the sides of adjacent batteries 1105. In both of the illustrated configurations, the cooling conduits are aligned with lower panel 1103, resulting in the coolant within channels 1111/1203 flowing in a direction substantially perpendicular to the axes of the cylindrical batteries. By regulating the flow of coolant within conduits 1109/1201 and/or regulating the transfer of heat from the coolant to another temperature control system, the temperature of cells 1105 may be regulated so that the cells remain within their preferred operating range. As it is generally desirable to limit the unintentional transfer of thermal energy between the batteries/cooling conduits and the battery pack enclosure, preferably one or more thermally insulating layers 1113 are interposed between the batteries/cooling conduits and the battery pack enclosure as shown. Thermally insulating layer(s) 1113 may be comprised of air or some other thermally insulating material that preferably has a thermal conductivity of less than 1.0 $Wm^{-1}K^{-1}$ at 25° C., and more preferably less than 0.2 $Wm^{-1}K^{-1}$ at 25° C.

In a conventional EV with a large battery pack, the battery pack enclosure is normally mounted under the vehicle as in the embodiments shown in FIGS. 9 and 10. In such a configuration the battery pack enclosure will typically extend substantially between the front and rear suspension assemblies and be attached to the chassis via the left and right rockers. This mounting location is generally considered to be optimal from a packaging point of view since the impact on the passenger and luggage compartments is minimized. Additionally this mounting location helps to achieve a low center of gravity and a desirable vehicle weight distribution. Unfortunately this location exposes the battery pack enclosure to more potential harm from road debris than it would otherwise encounter if it were mounted further from the road surface, for example behind the rear seats in a vertical configuration.

In order to protect the battery pack enclosure from damage, in particular damage from road debris that may be encountered when driving, in at least one embodiment of the invention a bumper is attached to the front of the battery pack enclosure. By preventing or at least significantly limiting damage to the front of the battery pack enclosure, the risk of some of the contained batteries entering into thermal runaway, a potentially catastrophic event, is reduced. The bumper, which is preferably fabricated from steel or a similar material with a strength of at least 1000 MPa, is bolted, welded, brazed, bonded, soldered or otherwise attached to the front of the battery pack enclosure, and preferably attached to the front cross-member of the battery pack enclosure.

Figure 13:
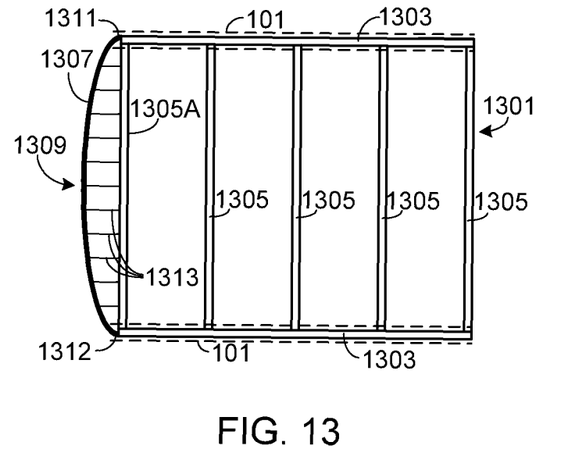
FIG. 13 provides a view of a bumper mounted to a battery pack enclosure in accordance with a preferred embodiment.
Figure 14:
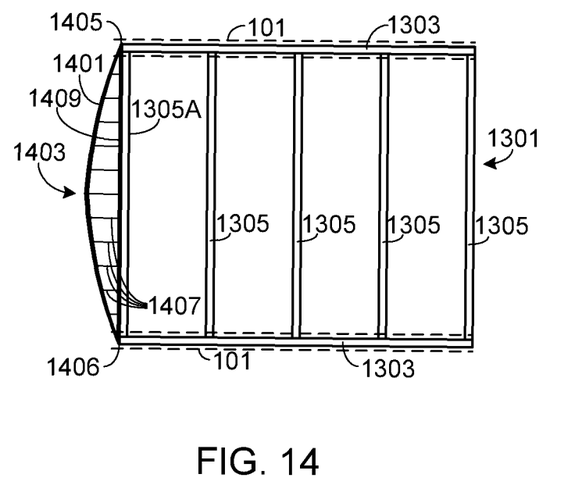
FIG. 14 provides a view of a bumper mounted to a battery pack enclosure in accordance with an alternate embodiment.

FIGS. 13 and 14 illustrate two preferred battery pack bumper configurations. In these figures a simplified view of battery pack enclosure 1301 is shown in which the batteries, battery mounts, battery interconnects and the lower battery pack panel have been eliminated for clarity. Additionally, while the battery pack enclosure in these figures is shown with side members 1303 and a plurality of cross-members 1305, it should be understood that the invention is equally applicable to other pack configurations.

In the bumper assembly shown in FIG. 13, bumper 1307 is curvilinear while bumper 1401 of FIG. 14 has a more linear design. Regardless of the amount of curvature utilized, the bumper is shaped to promote any debris that strikes the bumper being deflected sideways and thus away from the battery pack enclosure and the vehicle. Accordingly and as illustrated, the center of the battery pack bumper extends the furthest forward of the battery pack enclosure, e.g., furthest forward of the plane containing the lead battery pack cross-member. From the center of the bumper and outwards to the bumper edges, the bumper face tapers away. Therefore in the battery pack configuration shown in FIG. 13, the separation distance between lead battery pack enclosure cross-member 1305A and the front face of bumper 1307 is greatest at bumper center 1309 and then continually decreases all the way to the bumper edges 1311/1312. Similarly, the separation distance between lead battery pack cross-member 1305A and the front face of bumper 1401 is greatest at bumper center 1403 and then decreases all the way to the bumper edges 1405/1406.

Figure 15:
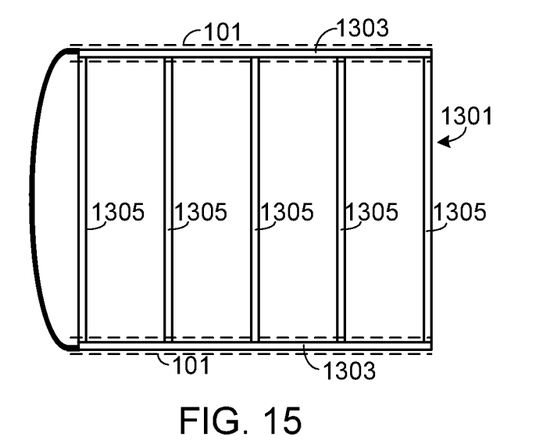
FIG. 15 provides a view of a bumper mounted to a battery pack enclosure in accordance with an alternate embodiment.
Figure 16:
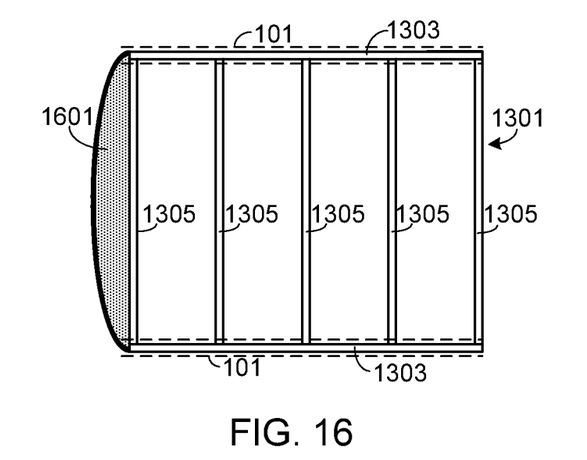
FIG. 16 provides a view of an embodiment similar to that shown in FIG. 13 in which an energy absorbing compressible material is interposed between the bumper and the battery pack enclosure.
Figure 17:
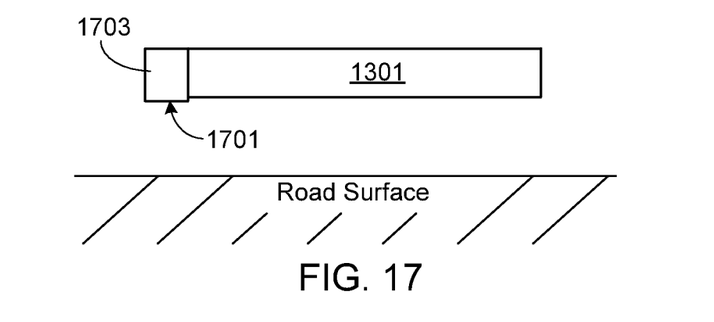
FIG. 17 provides a side view of a bumper assembly in accordance with the invention.

In order to distribute the force of an impact with a piece of debris and thereby minimize battery pack damage, preferably the battery pack bumper is separated from the front edge of the battery pack enclosure using a plurality of bracing struts. These struts may be interposed between the rear face of the bumper and the front face of the battery pack enclosure as illustrated in FIG. 13 (e.g., struts 1313), or they may be interposed between the rear face of the bumper and a secondary bumper plate mounted at the rear of the bumper assembly as illustrated in FIG. 14 (e.g., struts 1407 and secondary bumper plate 1409). In at least one configuration of the invention (see FIG. 15) rather than using a plurality of struts, only the edges of the bumper are attached to the battery pack enclosure, thus allowing the bumper to undergo substantial deformation upon impact with the debris prior to the rear surface of the bumper impacting the battery pack. Preferably in this configuration the edges of the bumper are attached to the rockers, thereby further isolating the battery pack enclosure and the batteries contained therein from potential damage when the bumper is hit by debris. It yet another configuration illustrated in FIG. 16, the space between the rear face of the bumper and the battery pack enclosure is filled with an energy absorbing compressible material 1601, such as an open- or closed-cell sponge or foam, that prevents and/or minimizes battery pack damage by absorbing the debris impact energy. Note that regardless of the configuration used for the battery pack bumper, in order to insure effectiveness the lower edge 1701 of the bumper 1703 is at least as low as the lowest surface of the battery pack, and preferably lower than the lowest surface of the battery pack as illustrated in the side view of the battery pack assembly shown in FIG. 17.

Figure 18:
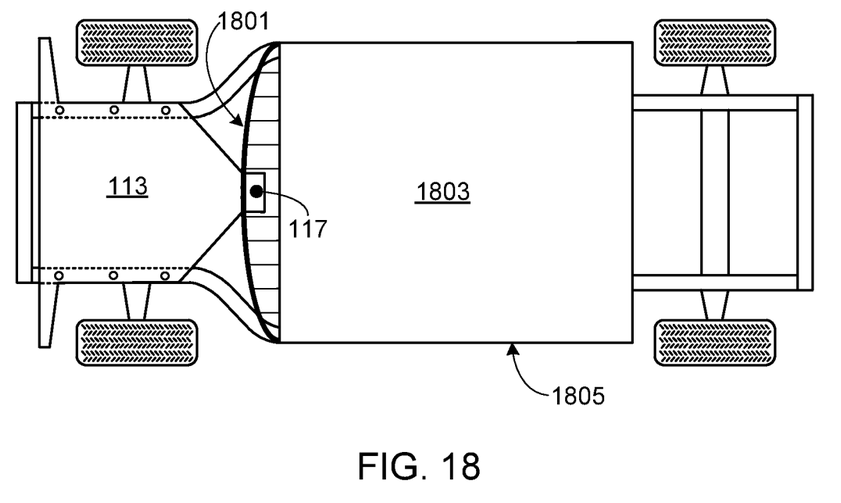
FIG. 18 provides a view of an embodiment similar to that shown in FIG. 9 which includes a bumper mounted to the battery pack enclosure.
Figure 19:
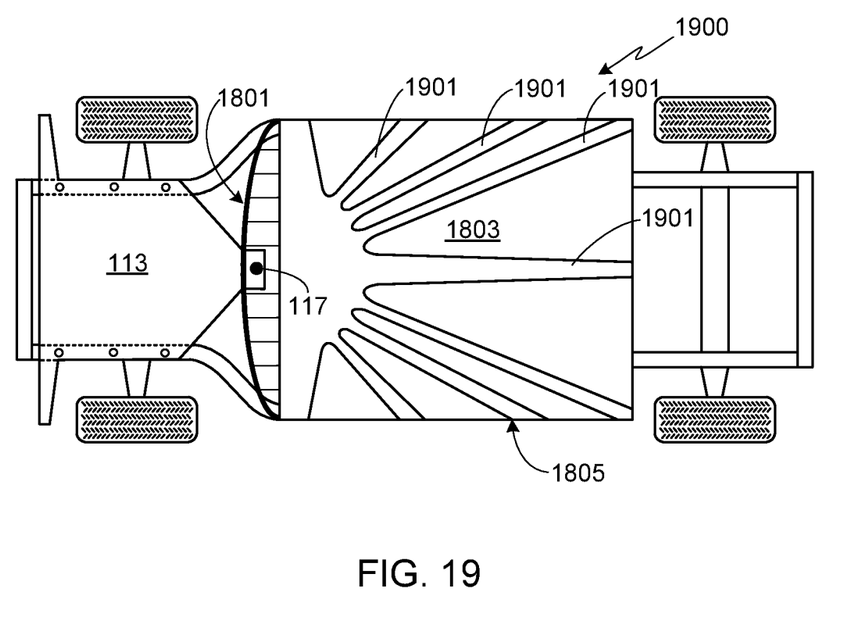
FIG. 19 provides a view of an embodiment similar to that shown in FIG. 18 that includes a set of battery pack features configured to distribute impact force throughout the vehicle chassis.

As previously noted, the battery pack bumper as described above and exemplified in FIGS. 13-17 may be used in a conventional EV in which the front wheel subassemblies are not coupled to a swiveling subframe. In a preferred embodiment, however, the battery pack bumper is used in combination with a swiveling wheel assembly subframe. Two such configurations are shown in FIGS. 18 and 19 where hinge-mount 117 is coupled directly to battery pack bumper assembly 1801. The primary difference between the embodiments shown in FIGS. 18 and 19 is that in vehicle 1900 a plurality of impact force distribution structures 1901 are incorporated into the lower battery pack enclosure panel 1803. Force distribution structures 1901 may be additional structures that are bolted, bonded, brazed or welded to lower battery pack enclosure panel 1803. Alternately and as preferred, force distribution structures 1901 may be comprised of ridges or similar structures that are fabricated directly into lower battery pack enclosure panel 1803. Regardless of whether the force distribution structures 1901 are added to, or formed as part of, battery pack enclosure panel 1803, preferably the distal end of each structure 1901 is co-located at an attachment point between battery pack enclosure 1805 and the vehicle's undercarriage (e.g., rockers).

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A battery pack protection system, comprising:
a battery pack enclosure mounted under an electric vehicle, wherein said battery pack enclosure is configured to house a plurality of batteries;
a bumper attached to a front portion of said battery pack enclosure, wherein a central portion of said bumper extends furthest forward of said front portion of said battery pack enclosure, and wherein a lower edge of said bumper is at least as close to a road surface as a lowermost surface of said battery pack enclosure, wherein a separation distance between a front surface of said bumper and said front portion of said battery pack enclosure continually decreases from said central portion to a leftmost bumper edge, and wherein said separation distance between said front surface of said bumper and said front portion of said battery pack enclosure continually decreases from said central portion to a rightmost bumper edge.

2. The battery pack protection system of claim 1, said battery pack enclosure further comprising a front cross-member, wherein said bumper is mechanically coupled to said front portion of said battery pack enclosure via said front cross-member, and wherein said central portion of said bumper extends furthest forward of a plane containing said front cross-member of said battery pack enclosure.

3. The battery pack protection system of claim 1, wherein said lower edge of said bumper is closer to said road surface then said lowermost surface of said battery pack enclosure.

4. The battery pack protection system of claim 1, wherein said front surface of said bumper is curvilinear.

5. The battery pack protection system of claim 1, further comprising a plurality of bracing struts interposed between said bumper and said front portion of said battery pack enclosure.

6. The battery pack protection system of claim 1, further comprising an energy absorbing compressible material interposed between said bumper and said front portion of said battery pack enclosure.

7. The battery pack protection system of claim 6, wherein said energy absorbing compressible material is selected from an open-cell sponge, a closed-cell sponge, an open-cell foam and a closed cell foam.

8. The battery pack protection system of claim 1, said bumper further comprising a secondary bumper plate, wherein said secondary bumper plate is mechanically coupled to said bumper via a plurality of bracing struts, and wherein said bumper is mechanically coupled to said front portion of said battery pack enclosure via said secondary bumper plate.

9. The battery pack protection system of claim 1, said bumper further comprising a secondary bumper plate, wherein said bumper is mechanically coupled to said front portion of said battery pack enclosure via said secondary bumper plate, and further comprising an energy absorbing compressible material interposed between said bumper and said secondary bumper plate.

10. The battery pack protection system of claim 9, wherein said energy absorbing compressible material is selected from an open-cell sponge, a closed-cell sponge, an open-cell foam and a closed cell foam.

11. The battery pack protection system of claim 1, wherein said battery pack enclosure is attached to a vehicle chassis via a left-side rocker and a right-side rocker.

12. The battery pack protection system of claim 11, wherein said battery pack enclosure extends substantially between a front suspension assembly and a rear suspension assembly.

13. The battery pack protection system of claim 1, wherein said bumper is fabricated from steel.

14. The battery pack protection system of claim 1, wherein said bumper has a strength of at least 1000 MPa.

15. The battery pack protection system of claim 1, wherein said bumper is attached to said front portion of said battery pack enclosure using a fabrication technique selected from welding, bonding, soldering, brazing and bolting.

16. A battery pack protection system, comprising:
a battery pack enclosure mounted under an electric vehicle, wherein said battery pack enclosure is configured to house a plurality of batteries;
a bumper attached to a front portion of said battery pack enclosure, wherein a central portion of said bumper extends furthest forward of said front portion of said battery pack enclosure, and wherein a lower edge of said bumper is at least as close to a road surface as a lowermost surface of said battery pack enclosure, wherein at least a first portion of a front surface of said bumper is linear and at least a second portion of said front surface of said bumper is curvilinear, and wherein a separation distance between said front surface of said bumper and said front portion of said battery pack enclosure is greatest at said central portion of said bumper, wherein said separation distance between said front surface of said bumper and said front portion of said battery pack enclosure is equivalent at a leftmost bumper edge and a rightmost bumper edge, and wherein said separation distance between said front surface of said bumper and said front portion of said battery pack enclosure is least at said leftmost bumper edge and said rightmost bumper edge.

17. The battery pack protection system of claim 16, said battery pack enclosure further comprising a front cross-member, wherein said bumper is mechanically coupled to said front portion of said battery pack enclosure via said front cross-member, and wherein said central portion of said bumper extends furthest forward of a plane containing said front cross-member of said battery pack enclosure.

18. The battery pack protection system of claim 16, wherein said lower edge of said bumper is closer to said road surface then said lowermost surface of said battery pack enclosure.

19. The battery pack protection system of claim 16, further comprising a plurality of bracing struts interposed between said bumper and said front portion of said battery pack enclosure.

20. The battery pack protection system of claim 16, further comprising an energy absorbing compressible material interposed between said bumper and said front portion of said battery pack enclosure.

21. The battery pack protection system of claim 20, wherein said energy absorbing compressible material is selected from an open-cell sponge, a closed-cell sponge, an open-cell foam and a closed cell foam.

22. The battery pack protection system of claim 16, said bumper further comprising a secondary bumper plate, wherein said secondary bumper plate is mechanically coupled to said bumper via a plurality of bracing struts, and wherein said bumper is mechanically coupled to said front portion of said battery pack enclosure via said secondary bumper plate.

23. The battery pack protection system of claim 16, said bumper further comprising a secondary bumper plate, wherein said bumper is mechanically coupled to said front portion of said battery pack enclosure via said secondary bumper plate, and further comprising an energy absorbing compressible material interposed between said bumper and said secondary bumper plate.

24. The battery pack protection system of claim 23, wherein said energy absorbing compressible material is selected from an open-cell sponge, a closed-cell sponge, an open-cell foam and a closed cell foam.

25. The battery pack protection system of claim 16, wherein said battery pack enclosure is attached to a vehicle chassis via a left-side rocker and a right-side rocker.

26. The battery pack protection system of claim 25, wherein said battery pack enclosure extends substantially between a front suspension assembly and a rear suspension assembly.

27. The battery pack protection system of claim 16, wherein said bumper is fabricated from steel.

28. The battery pack protection system of claim 16, wherein said bumper has a strength of at least 1000 MPa.

29. The battery pack protection system of claim 16, wherein said bumper is attached to said front portion of said battery pack enclosure using a fabrication technique selected from welding, bonding, soldering, brazing and bolting.

* * * * *